United States Patent [19]

Vaidya et al.

[11] Patent Number: 4,983,869

[45] Date of Patent: Jan. 8, 1991

[54] MAGNETIC BEARING

[75] Inventors: Jayant Vaidya; Raghunath G. Mokadam, both of Rockford, Ill.

[73] Assignee: Sundstrand Corporation, Rockford, Ill.

[21] Appl. No.: 390,712

[22] Filed: Aug. 8, 1989

[51] Int. Cl.⁵ .............................................. F16C 39/06
[52] U.S. Cl. .................................................... 310/90.5
[58] Field of Search ................... 310/90.5; 324/207.11, 324/207.25

[56] References Cited

U.S. PATENT DOCUMENTS

| | | |
|---|---|---|
| 3,261,210 | 7/1966 | Buchhold ............................ 310/90.5 |
| 3,845,997 | 11/1974 | Boden et al. . |
| 3,865,442 | 2/1975 | Studer . |
| 3,877,761 | 4/1975 | Boden ................................. 310/90.5 |
| 4,037,886 | 7/1977 | Boden et al. . |
| 4,082,376 | 4/1978 | Wehde et al. . |
| 4,398,773 | 8/1983 | Boden et al. . |
| 4,583,794 | 4/1986 | Takahara et al. . |

FOREIGN PATENT DOCUMENTS

| | | | |
|---|---|---|---|
| 2331613 | 1/1975 | Fed. Rep. of Germany ..... | 310/90.5 |
| 2336603 | 2/1977 | France ................................. | 310/90.5 |
| 0184319 | 10/1983 | Japan ................................... | 310/90.5 |
| 0043220 | 3/1984 | Japan ................................... | 310/90.5 |
| 0066541 | 4/1986 | Japan ................................... | 310/90.5 |

Primary Examiner—R. Skudy
Attorney, Agent, or Firm—Antonelli, Terry, Stout & Kraus

[57] ABSTRACT

A magnetic bearing (10) in accordance with the invention includes a rotatably supported member (14) having a cylindrical magnet (12) with first and second ends which respectively are first and second magnetic poles with a magnetic field produced by the magnet having a uniform strength around a circumference of the first and second ends; a first sensor (34 or 36) for sensing a direction and amount of radial movement of the rotatable member along a first axis (54 or 56) from a uniform spacing with respect to an annulus (35) surrounding the rotatable member and producing a first signal proportional to the direction and amount of movement along the first axis; and a first electromagnetic circuit (16 to 18) producing an electromagnetic field proportional to the first signal which is additive to the magnetic field along the first axis extending in a radial direction of increased radial spacing between the annulus and the rotatable member and which is subtractive from the magnetic field along the first axis extending in a radial direction of decreased spacing.

29 Claims, 5 Drawing Sheets

MAGNETIC BEARING

DESCRIPTION

1. Technical Field

The present invention relates to magnetic bearings for supporting rotating members.

2. Background Art

Electromagnetic and permanent magnet bearings are used for supporting rotating machinery. Additionally, combinations of electromagnetic and permanent magnetic bearings have been proposed for supporting rotating machinery. Examples of magnetic bearings are disclosed in U.S. Pat. Nos. 3,865,442, 3,845,997, 4,037,886, 4,082,376, 4,398,773 and 4,583,794.

Current electromagnetic bearings are subject to eddy current losses and/or an unacceptably high electrical power input to the bearing. Eddy current losses are caused by alternating magnetic fluxes in pole pieces. The electrical power input to an electromagnetically powered magnetic bearing is determined by the amount of electrical current needed to provide the mechanical force to support a rotating member.

A need exists for a magnetic bearing which has low electrical power consumption and further provides dynamic electromagnetic field generation which opposes dynamic loads applied to a rotating member supported by the magnetic bearing.

DISCLOSURE OF INVENTION

The present invention provides a magnetic bearing for rotatably supporting a member which utilizes an electromagnetically generated field or a combination of a magnetic field generated by a permanent magnet and an electromagnet. When the combination of an electromagnetic and permanent magnetic field is utilized, the permanent magnet should be chosen to provide an average magnetic flux necessary to support the member so that the electrical power applied to the electromagnet necessary to maintain support of the member at a uniform spacing from contacting bearing surfaces is small.

In accordance with the invention, the rotatable member is comprised of a shaft, which is made from either a magnetic or non-magnetic material, a cylindrical magnet disposed around the shaft and a pair of annular magnetically permeable pole pieces. The cylindrical magnet has first and second ends which are respectively first and second opposite magnetic poles with a magnetic field produced by the magnet having a uniform strength around a circumference of the first and second ends. At least one electromagnetic circuit generates an electromagnetic field coupled to the rotatable member which is generated by electromagnets within the magnetic circuit to produce a magnetic field which is additive to the permanent magnetic field along at least one of first and second orthogonal axes parallel to a radial direction of increased radial spacing between at least one annulus surrounding the rotatable member and is subtractive from the permanent magnetic field along at least one of the first and second axes in a radial direction of decreased radial spacing between the annulus and the rotatable member. Sensors are provided for sensing movement of the rotatable member from a uniform spacing with respect to the annulus along the first and second orthogonal axes. The sensors each produce a control signal respectively for controlling the magnitude of the electromagnetic field, which is preferably proportional to the amount of movement, along the first and second axes from the uniform spacing.

By utilizing a dynamically generated magnetic field which is added to and subtracted from a magnetic field which is symmetrically disposed around the circumference of a rotatable member supported by a magnetic bearing in accordance with the invention, it is possible to precisely control the position of the rotatable member to maintain a uniform spacing with respect to the at least one annulus surrounding the rotatable member in response to external forces such as gravitational or other radial loads applied to the rotatable member. Furthermore, when the cylindrical magnet is a permanent magnet, the quantity of electrical energy required to maintain the uniform spacing with respect to the at least one annulus may be minimized given the fact that the magnitude of the electromagnetically generated field is only used to generate a force necessary to cancel movement of the rotatable member from the uniform spacing and suspend the rotatable member from contact with poles defining the annulus. The magnetic bearing of the present invention has a high speed response characteristic which permits the bearing to be effective in rotatably supporting a member subject to dynamic radial load variations having a high frequency such as those produced by mechanical resonance when the member is accelerated.

A magnetic bearing in accordance with the invention includes a rotatable member with a cylindrical magnet having first and second ends which respectively are first and second opposite magnetic poles with a magnetic field produced by the magnet having a uniform strength around a circumference of the first and second ends and first and second magnetically permeable annular pole pieces, the first annular pole piece facing the first end of the cylindrical magnet and the second annular pole piece facing the second end of the cylindrical magnet; and a magnetic field generator, responsive to a force applied to the rotatable member causing movement of the rotatable member from a uniform spacing with respect to annuli surrounding the rotatable member, for producing a radially directed magnetic field generated by at least one electromagnet coupled to the pole pieces which is summed with the magnetic field produced by the cylindrical magnet and opposes the radially directed force which caused movement of the rotatable member from the uniform spacing to cause movement of the rotatable member back to the uniform spacing. The annular pole pieces preferably are comprised of a plurality of annular laminates of a magnetically permeable material. The magnetic field generator for producing a radially directed magnetic field comprises a sensor for sensing movement of the member along two axes from the uniform spacing and producing first and second control signals respectively proportional to movement along the orthogonal axes with respect to an annulus; an amplifier, coupled to the control signals, for producing first, second, third and fourth magnetic control signals with the first and second magnetic control signals being proportional to a direction and amount of movement along the first axis from the uniform spacing and the third and fourth magnetic control signals being proportional to a direction and amount of movement along the second axis; the first and second electromagnets each having first and second poles, the first poles and the second poles of the first and second electromagnets being diametrically disposed with respect to the rotatable member and being contained in a first magnetic circuit with the first poles of the first and second electromagnets being magnetically coupled to the first pole piece and the second poles of the first and second electromagnets being magnetically coupled to the second pole piece; the third and fourth electromagnets each having first and second poles, the first and second poles of the third and fourth electromagnets being diametrically disposed with respect to the rotatable member and being contained in a second magnetic circuit with the first poles of the third and fourth electromagnets being magnetically coupled to the first pole piece and the second poles of the third and fourth electromagnets being magnetically coupled to the second pole piece; and wherein the first and second magnetic control signals are respectively applied to the first and second electromagnets to cancel movement along the first axis from the uniform spacing and the third and fourth electromagnet control signals are respectively applied to the third and fourth electromagnets to cancel movement along the second axis from the uniform spacing. The electromagnetic field generated by the electromagnets is additive to the permanent magnetic field along at least one of the first and second axes extending in a radial direction of increased radial spacing between the annulus and the rotatable member and is subtractive from the permanent magnetic field along at least one of the first axes in a radial direction of decreased radial spacing between the annulus and the rotatable member. The first, second, third and fourth electromagnets are uniformly spaced around a desired position of the circumference of the rotatable member. The cylindrical magnet is preferably a permanent magnet. A retainer may be provided for retaining the cylindrical magnet in place. The retainer may be a hollow cylindrical sleeve having an inner cylindrical surface which contacts an outer cylindrical surface of the cylindrical magnet, a first end of the sleeve contacting the first annular pole piece and a second end of the sleeve contacting the second annular pole piece.

A magnetic bearing in accordance with the invention for rotatably supporting a rotatable member having first and second magnetically permeable annular pole pieces; first and second electromagnets each having first and second poles, the first poles and the second poles of the first and second electromagnets being diametrically disposed with respect to the rotatable member and being contained in a first magnetic circuit with the first poles of the first and second electromagnets being magnetically coupled to the first pole piece and the second poles of the first and second electromagnets being magnetically coupled to the second pole piece; third and fourth electromagnets each having first and second poles, the first poles and the second poles of the third and fourth electromagnets being diametrically disposed with respect to the rotatable member and being contained in a second magnetic circuit with the first poles of the third and fourth electromagnets being magnetically coupled to the first pole piece and the second poles of the third and fourth electromagnets being magnetically coupled to the second pole piece; a first sensor for sensing an amount and a direction of movement of the rotatable member from a uniform spacing with respect to an annulus defined by poles of the electromagnets along a first axis and producing a first output signal proportional to an amount and direction of movement of the rotatable member from the uniform spacing along the first axis; a second sensor for sensing an amount and direction of movement of the rotatable member from a uniform spacing with respect to the annulus along a second axis orthogonal to the first axis and producing a second output signal proportional to an amount and direction of movement of the rotatable member from the uniform spacing along the second axis; and a control, responsive to the position signals, for applying a control current to windings of the first and second electromagnets in response to the first output signal and to the windings of the third and fourth electromagnets in response to the second output signal to cause the rotatable member to move to the uniform spacing. The first, second, third and fourth electromagnets are uniformly spaced around the circumference of the rotatable member. The first and second magnetic circuits are comprised of a laminated magnetically permeable material which passes magnetic flux from the poles of the cylindrical permanent magnet between the first and second annular pole pieces or of a powdered material.

A magnetic bearing in accordance with the invention includes a rotatably supported member having a cylindrical magnet with first and second ends which respectively are first and second opposite magnetic poles with a magnetic field produced by the magnet having a uniform strength around a circumference of the first and second ends; a first sensor for sensing a direction and amount of movement of the rotatable member along a first axis from a uniform spacing with respect to an annulus surrounding the rotatable member and producing a first signal proportional to the direction and amount of movement along the first axis from the uniform spacing; and the first electromagnetic circuit producing an electromagnetic field proportional to the first signal which is additive to the magnetic field along the first axis extending in a first radial direction of increased radial spacing between the annulus and the rotatable member and is subtractive from the magnetic field along the first axis extending in a first radial direction of decreased radial spacing. Furthermore, the magnetic bearing includes a second sensor for sensing a direction and amount of movement of the rotatable member along a second axis orthogonal to the first axis from a uniform spacing with respect to the annulus surrounding the rotatable member and producing a second signal proportional to the direction and amount of movement along the second axis from the uniform spacing; and a second electromagnetic circuit producing an electromagnetic field proportional to the second signal which is additive to the magnetic field along the second axis extending in a second radial direction of increased radial spacing orthogonal to the first radial direction of increased radial spacing between the annulus and the rotatable member and is subtractive from the magnetic field along the second axis extending in a second radial direction of decreased spacing orthogonal to the first radial direction of decreased radial spacing.

BEST MODE FOR CARRYING OUT THE INVENTION

Figure 1:
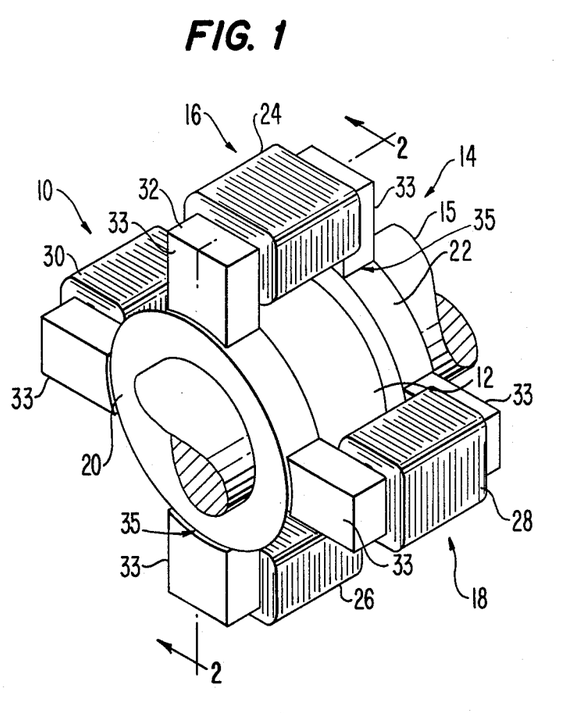
FIG. 1 illustrates a perspective view an embodiment of a magnetic bearing in accordance with the present invention.

FIG. 1 illustrates an embodiment of a magnetic bearing 10 in accordance with the present invention. The magnetic bearing 10 utilizes a combination of a magnetic field generated by a hollow cylindrical magnet 12 and a dynamically variable electromagnetic field generated by a magnetic field generator comprising first and second magnetic circuits 16 and 18 which are disposed 90° apart with respect to first and second magnetically permeable pole pieces 20 and 22. The magnetic bearing 10 of the invention rotatably supports member 14 comprised of shaft 15, cylindrical magnet 12 which is mounted on the shaft and the annular pole pieces 20 and 22 which are mounted on the shaft outboard from and facing the poles of the cylindrical magnet. The shaft 15 may be made from either a magnetic or non-magnetic material. The pole pieces 20 and 22 may be manufactured from laminates or from a powdered material. The first magnetic circuit 16 is comprised of first and second electromagnets 24 and 26. The second magnetic circuit 18 is comprised of third and fourth electromagnets 28 and 30. Poles 33 define a pair of annuli 35 which define a uniform spacing which is described below with reference to FIG. 3 which the magnetic bearing 10 of the present maintains with respect to the rotatably supported member 14. FIG. 1 does not illustrate sensors for sensing the direction and amount of movement of the member 14 along first and second orthogonal axes as described below in conjunction with FIG. 3 from a uniform spacing with respect to the annuli 35 of the pole pieces 20 and 22. The position sensors, which are discussed below with respect to FIG. 2, produce first and second position signals, which respectively are proportional to the direction and amount of movement of the member 14 along first and second orthogonal axes from the uniform spacing illustrated in FIG. 3. The position signals are amplified by an amplifier discussed below with reference to FIG. 2 to produce electrical current which is applied to the ,first, second, third, and fourth electromagnets 24, 26, 28 and 30 to oppose movement of the member along the first and second axes from a uniform spacing with respect to the annuli 35 of the pole pieces 20 and 22.

The cylindrical magnet 12 preferably is a permanent magnet which produces a magnetic field having a uniform strength around the circumference of the cylindrical magnet which is magnetically coupled to the first and second pole pieces 20 and 22 which reduce eddy currents and have a low reluctance to permit efficient coupling of magnetic flux in the magnetic bearing as discussed below. One end of the cylindrical magnet 12 is a north pole and another end of the cylindrical magnet is a south pole. The first and second magnetic circuits 16 and 18 produce a variable magnetic field controlled by signals produced by the aforementioned position sensors which is additive to the permanent magnetic field produced by the cylindrical magnet 12 along at least one of the first and second axes extending in a radial direction of increased radial spacing between the annuli 35 surrounding the first and second pole pieces 20 and 22 and the rotatable member 14 and is subtractive from the permanent magnetic field produced by the cylindrical magnet 12 along at least one of the first and second axes extending in a radial direction of decreased radial spacing between the annuli and the member as discussed below in conjunction with FIGS. 3, 4A, 4B, 5A and 5B. Each of the electromagnets 24–30 is wound on a U-shaped yoke 32 which is preferably constructed from laminates to reduce eddy current losses. The laminates within the yokes have not been illustrated for purposes of clarity in the drawings.

Figure 2:
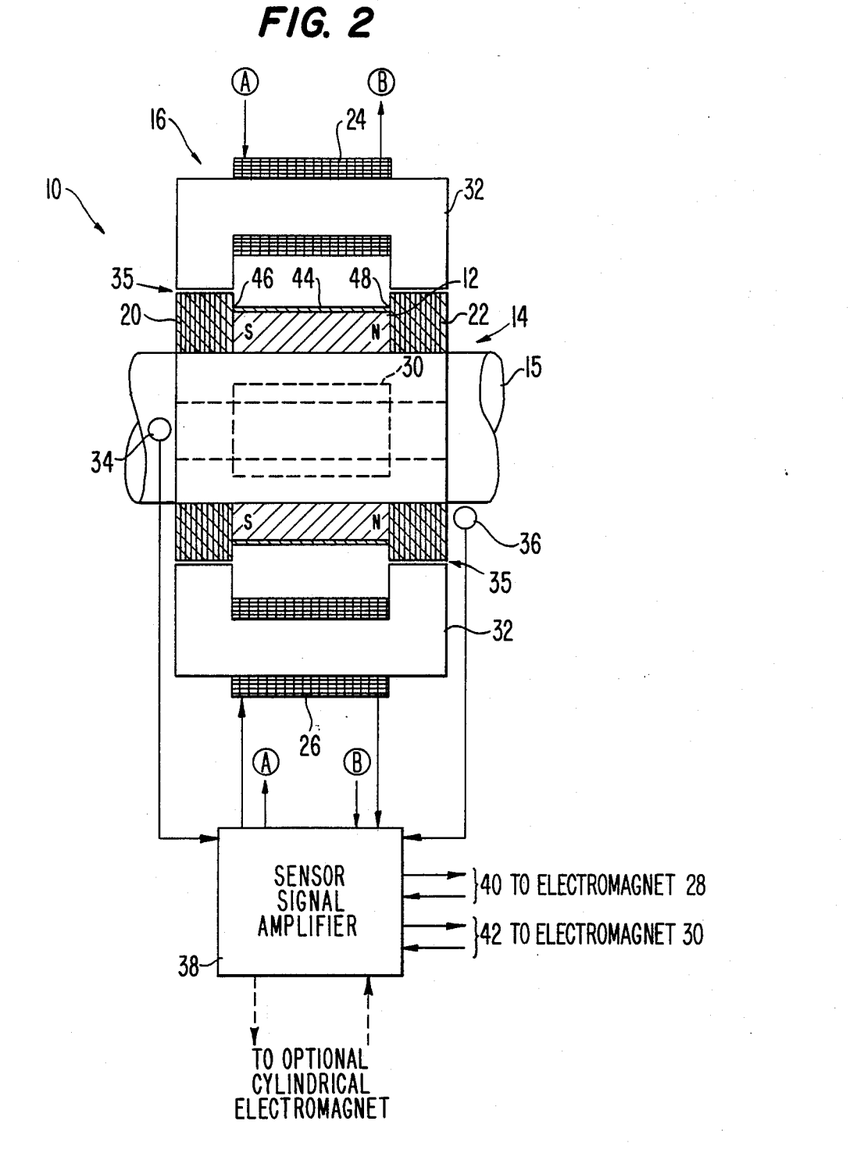
FIG. 2 illustrates a sectional view of the magnetic bearing of FIG. 1.

FIG. 2 illustrates a sectional view of the magnetic bearing 10 of FIG. 1 which includes first and second radial position sensors 34 and 36, which have been referred to above, that respectively produce position signals proportional to the direction and amount of movement of the member 14 from a uniform spacing from the annuli 35 along first and second orthogonal axes as discussed below with reference to FIG. 3. Identical reference numerals identify like parts in FIGS. 1 and 2. The position signals produced by the position sensors 34 and 36 are processed by the sensor signal amplifier 38 to produce control, currents for application to the electromagnets 24, 26, 28 and 30. The sensor signal amplifier 38 performs two functions in the operation of the magnetic bearing of the present invention which are the providing of a current to lift the rotatable member 14 from contacting the poles 33 and centering the rotatable member 14 both prior to rotation of the member and during rotation which counteracts forces applied to the rotatable member. The initial current provided by the signal amplifier 38 prior to rotation of the rotatable member 14 must be of sufficient magnitude to overcome the gravitational force acting on the rotatable member against the bottom poles 33 assuming that the axis of rotation of the rotatable member is not in line totally with the vertical. As soon as the rotatable member 14 "lifts off" from contact with the poles 33, the signal amplifier 38 functions to center the rotatable member under the control of the position signals as described below. The output signal lines from the sensor amplifier 38 are connected to all of the electromagnets including signal lines 40 being connected to the electromagnet 28 (not illustrated) and the signal lines 42 being connected to the electromagnet 30. It should be understood that the position signals produced by the position sensors 34 and 36 change polarity as a function of whether the movement of the rotatable member 14 along the first and second axis is in a first or a second direction as described below with reference to FIG. 3. A cylindrical retaining member 44 is provided for retaining the cylindrical permanent magnet 12 in a fixed radial position with respect to the rotatable member 14. A first end 46 of the cylindrical retaining member 44 is attached to annular pole piece 20 and a second end 48 of the cylindrical retainer is attached to the second pole piece 22. The purpose of the cylindrical retainer 44 is for providing radial stiffness for applications in which the rotatable member 14 is rotated at high velocities.

Figure 3:
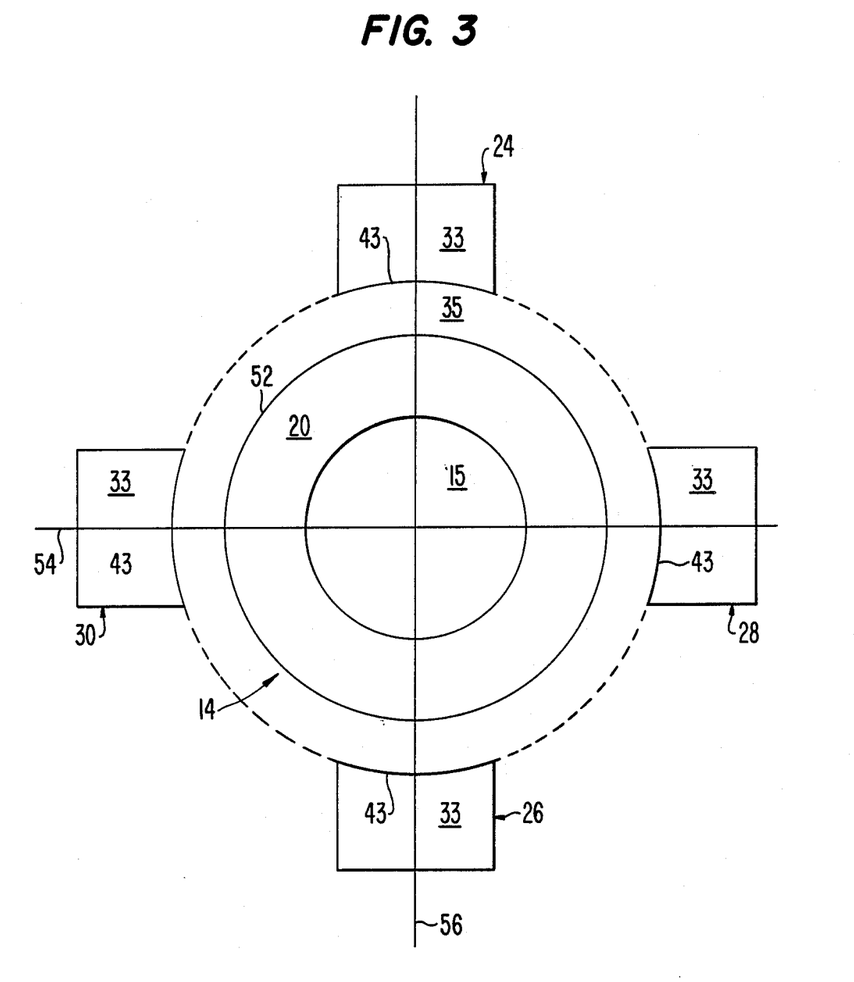
FIG. 3 illustrates a simplified end view of a magnetic bearing in accordance with the invention.

FIG. 3 illustrates an end view of the member 14 with respect to the annulus 35 between the pole piece 20 and the poles 33 of the electromagnets 24, 26, 28 and 30. Identical reference numerals identify like parts in FIGS. 1–3. The annulus 35 has been exaggerated for purposes of illustration. As illustrated, the rotatable member 14 is centered with respect to the annulus 35 with a uniform spacing between the curved surfaces 43 of the poles 33 and an outer cylindrical surface 52 of the pole piece 20. The uniform spacing is indicative of the desired position of the rotatable member 14 with respect to the annuli 35. It should be understood that the position sensors 34 and 36 sense movement of the rotatable member 14 with respect to the first and second orthogonal axes 54 and 56. The position sensor 34 produces an output signal of a first polarity when the rotatable member 14 moves to the left along axis 54 and produces an output signal of a second polarity when the rotatable member moves to the right along the axis 54 with the magnitude of the signal being proportional to the movement of the member from the uniform spacing as illustrated in FIG. 3. The position sensor 36 produces an output signal of a first polarity when the rotatable member 14 moves upward along the axis 56 and produces an output signal of a second polarity when the rotatable member moves downward along the axis 56 with the magnitude of the second signal being proportional to the movement of the rotatable member along the axis 56 from the uniform spacing as illustrated in FIG. 3. The position sensors 34 and 36 have been omitted from FIG. 3 for purposes of illustration but it should be understood that they would preferably be located along the axis 54 and 56 in proximity to the shaft 15.

Figure 4A:
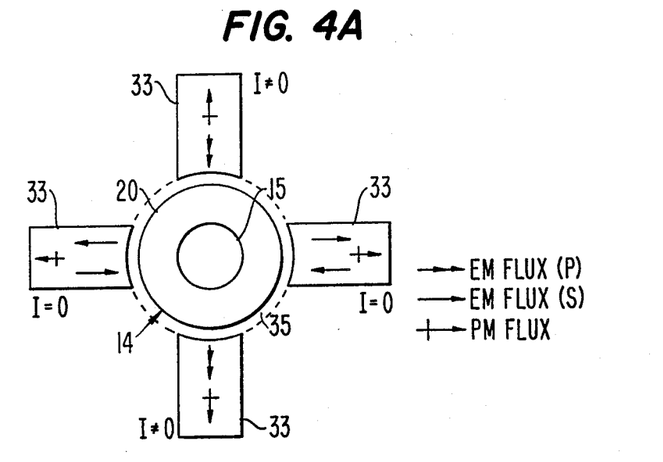
FIGS. 4A and 4B illustrate the magnetic flux in the magnetic bearing, prior to rotation of the rotatable member, counteracting gravity.
Figure 4B:
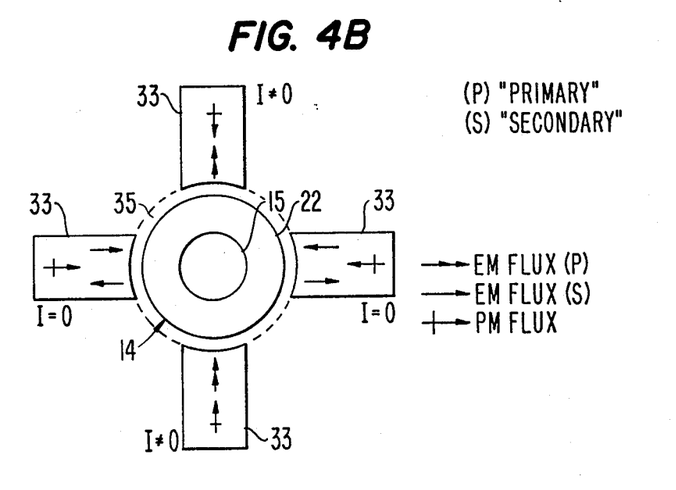

FIGS. 4A and 4B illustrate a diagram of flux contained in the pole pieces 20 and 22 and poles 33 with the rotatable member 14 lifted from contact with the poles prior to rotation having an axis of the rotation which is not completely vertical. Like reference numerals identify like parts in FIGS. 1-3 and 4A and 4B. In the position as illustrated FIG. 4A illustrates a view from the left with respect to FIG. 1 and FIG. 4B illustrates a view from the right with respect to FIG. 1. In the position as illustrated the current flowing in electromagnets 28 and 30 is zero and the current flowing in electromagnets 24 and 26 produces a magnetic field which suspends the rotatable member with a uniform spacing with respect to annuli 35 and from contact with the poles 33. The "EM FLUX (P)" represents the component of flux which is linked from one pole 33 diametrically (180°) to another pole of the electromagnets and the "EM FLUX(S)" represent the component of flux which is linked from one pole 33 to a pair of adjacent poles (90°). The pole pieces 20 and 22 represent a low reluctance to linkage of magnetic flux between the electromagnets 24, 26, 28 and 30 and the cylindrical magnet 12. Diametrical flux is additive or subtractive to the "PM FLUX" generated by the cylindrical magnet 12 which is preferably produced by a permanent magnet but may be produced by an electromagnet. As illustrated, the PM FLUX is of a uniform strength around the periphery of the cylindrical magnet 12. Prior to rotation of the member 14, the net flux in the poles 33 at 9 and 3 o'clock positions is zero which results in zero force being applied to the rotatable member in the horizontal direction and the net flux in the poles at 12 and 6 o'clock positions respectively is equal to the difference of the EM FLUX (P) and PM FLUX and to the sum of the EM FLUX (P) and PM FLUX which results in a vertically upward force being applied to the rotatable member which counteracts the force of gravity.

Figure 5A:
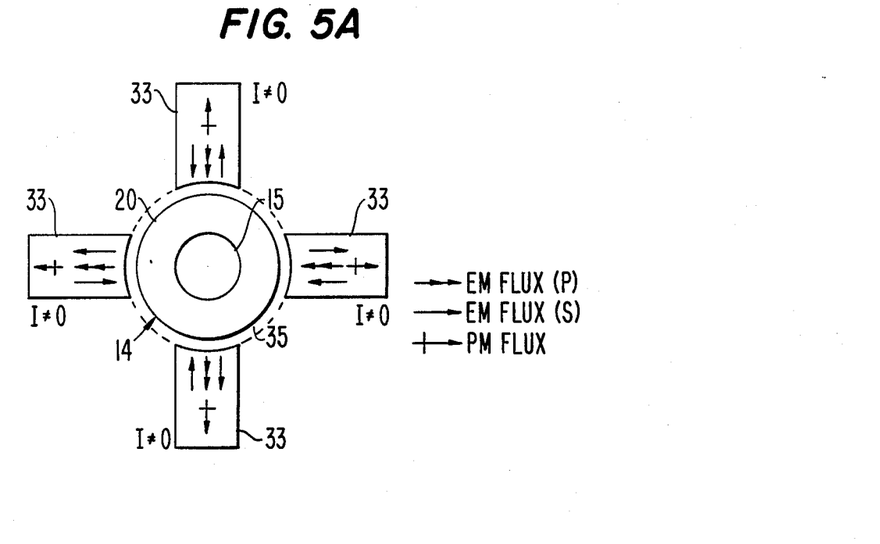
FIGS. 5A and 5B illustrate the magnetic flux in the magnetic bearing during rotation of the rotatable member during application of a radially directed horizontal force and also counteracting gravity.
Figure 5B:
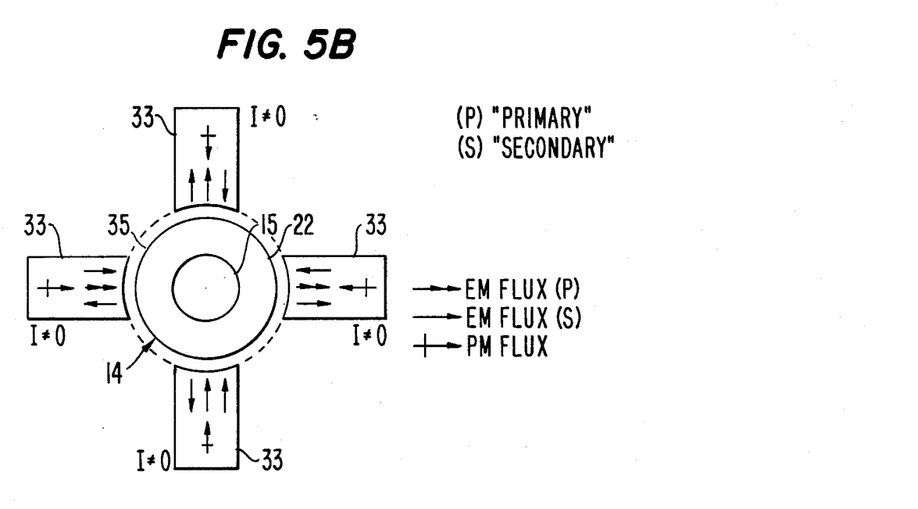

FIGS. 5A and 5B illustrate a diagram of flux contained in the pole pieces 20 and 22 and pole pieces with the rotatable member 14 having its axis of rotation with the same inclination as FIGS. 4A and 4B during rotation when a net force in the horizontal direction is applied to the rotatable member such as that caused by a resonance condition and a net force is applied in the vertical direction as explained above with reference to FIGS. 4A and 4B. Like legends are used in FIGS. 4A and 4B and 5A and 5B. In the position as illustrated the current flowing in the electromagnets 28 and 30 produces a magnetic field at the 9 and 3 o'clock position which counteracts the net force in the horizontal direction acting on the rotatable member 14 and the current flowing in the electromagnets 24 and 26 produces a magnetic field at the 12 and 6 o'clock positions which counteracts the net force acting on the rotatable member 14 in the vertical direction. The magnetic field in the poles 33 at the 6 and 9 o'clock positions is equal to the sum of the EM FLUX (P) and the PM FLUX and at the 12 and 3 o'clock positions is equal to the difference of the EM FLUX (P) and PM FLUX.

The position sensors 34 and 36 continually produce position signals during the operational modes of FIGS. 4A, 4B, 5A and 5B which sense movement of the rotatable member 14 from a uniform spacing with respect to the annuli 35 defined by the poles 33. The sensor signal amplifier varies the signals applied to the electromagnets 24, 26, 28 and 30 to produce a net magnetic field to maintain the rotatable member in a centered position with respect to annuli 35 and to cancel constant forces applied to the rotatable member such as the force of gravity.

While the invention has been described in terms of a preferred embodiment, it should be understood that numerous modifications may be made thereto without departing from the spirit and scope of the invention. For example, while the utilization of a cylindrical permanent magnet 12 is desirable for minimizing consumption of electrical power and providing for the generation of the control currents as a linear function of the position of the rotatable member 14 with respect to the annuli 35, the invention may also be practiced with a cylindrical magnet which is an electromagnet or without any cylindrical magnet but with only pole pieces 20 and 22. It should be understood that the invention is applicable to diverse applications including those involving high rotational velocities in which long life of bearings with minimal mechanical drag is important.

We claim:

1. A magnetic bearing comprising:
   a rotatable member, having a cylindrical magnet with first and second ends which respectively are first and second magnetic poles with a magnetic field produced by the magnet having a uniform strength around a circumference of the first and second ends and first and second magnetically permeable annular pole pieces, the first annular pole piece facing the first end of the cylindrical magnet and the second annular pole piece facing the second end of the cylindrical magnet; and
   a magnetic field generator, responsive to a force applied to the rotatable member causing movement of the rotatable member from a uniform spacing with respect to annuli surrounding the rotatable member, for producing a magnetic field generated by at least one electromagnet coupled to the pole pieces which is summed with the magnetic field produced by the cylindrical magnet and opposes the force which caused movement of the rotatable member from the uniform spacing to cause movement of the rotatable member back to the uniform spacing.

2. A magnetic bearing in accordance with claim 1 wherein the annular pole pieces each comprise:
   a powdered material.

3. A magnetic bearing in accordance with claim 1 wherein the annular pole pieces each comprise:

a plurality of annular laminates of a magnetically permeable material.

4. A magnetic bearing in accordance with claim 1 wherein the magnetic field generator comprises:

means for sensing movement of the rotatable member along first and second orthogonal axes from the uniform spacing, producing first and second control signals respectively proportional to a direction and an amount of the sensed movement of the rotatable member along the first and second orthogonal axes from the uniform spacing, and producing from the first and second control signals, first and second electromagnet control signals being proportional to the direction and amount of the sensed movement of the rotatable member along the first orthogonal axis from the uniform spacing and third and fourth electromagnet control signals being proportional to the direction and amount of the sensed movement of the rotatable member along the second orthogonal axis from the uniform spacing;

first and second electromagnets each having first and second poles, the first poles and the second poles of the first and second electromagnets being diametrically disposed with respect to the rotatable member and being contained in a first magnetic circuit including the first and second annular pole pieces with the first poles of the first and second electromagnets being magnetically coupled to the first pole piece and the second poles of the first and second electromagnets being magnetically coupled to the second pole piece;

third and fourth electromagnets each having first and second poles, the first poles and the second poles of the third and fourth electromagnets being diametrically disposed with respect to the rotatable member and being contained in a second magnetic circuit including the first and second annular pole pieces with the first poles of the third and fourth electromagnets being magnetically coupled to the first pole piece and the second poles of the third and fourth electromagnets being magnetically coupled to the second pole piece; and wherein the first and second electromagnet control signals are respectively applied to the first and second electromagnets to cancel movement of the rotatable member along the first axis from the uniform spacing and the third and fourth electromagnet control signals are respectively applied to the third and fourth electromagnets to cancel movement of the rotatable member along the second axis from the uniform spacing.

5. A magnetic bearing in accordance with claim 4 wherein:

the magnetic field generated by the electromagnets is additive to the magnetic field produced by the cylindrical magnet along at least one of the first and second axes extending in a radial direction of increased radial spacing between the annuli and the rotatable member and is subtractive from the magnetic field produced by the cylindrical magnet along at least one of the first and second axes extending in a radial direction of decreased radial spacing between the annuli and the rotatable member.

6. A magnetic bearing in accordance with claim 5 wherein:

the first magnetic circuit comprises first and second cores respectively contained in the first and second electromagnets of a magnetically permeable material and each coupling the first and second poles of the cylindrical magnet together; and the second magnetic circuit comprises third and fourth cores respectively contained in the third and fourth electromagnets of a magnetically permeable material and each coupling the first and second poles of the cylindrical magnet together.

7. A magnetic bearing in accordance with claim 6 wherein:

the first and second magnetic circuits are disposed 90° apart with respect to a circumference of the rotatable member.

8. A magnetic bearing in accordance with claim 1 wherein:

the cylindrical magnet is a permanent magnet.

9. A magnetic bearing in accordance with claim 2 wherein:

the cylindrical magnet is a permanent magnet.

10. A magnetic bearing in accordance with claim 3 wherein:

the cylindrical magnet is a permanent magnet.

11. A magnetic bearing in accordance with claim 4 wherein:

the first and second magnetic circuits are disposed 90° apart with respect to a circumference of the rotatable member.

12. A magnetic bearing in accordance with claim 5 wherein:

the first and second magnetic circuits are disposed 90° apart with respect to a circumference of the rotatable member.

13. A magnetic bearing in accordance with claim 1 wherein the magnetic field generator comprises:

means for sensing a direction and an amount of movement of the rotatable member along first and second orthogonal axes from the uniform spacing and producing first, second, third and fourth electromagnet control signals proportional to the direction and amount of the sensed movement of the rotatable member along the first and second orthogonal axes from the uniform spacing with the first and second electromagnet control signals being produced in response to the sensed movement of the rotatable member along the first axis and the third and fourth electromagnet control signals being produced in response to the sensed movement of the rotatable member along the second axis;

first and second electromagnets each having first and second poles, the first poles and the second poles of the first and second electromagnets being diametrically disposed with respect to the rotatable member and being contained in a first magnetic circuit including the first and second annular pole pieces with the first poles of the first and second electromagnets being magnetically coupled to the first pole piece and the second poles of the first and second electromagnets being magnetically coupled to the second pole piece;

third and fourth electromagnets each having first and second poles, the first poles and the second poles of the third and fourth electromagnets being diametrically disposed with respect to the rotatable member and being contained in a second magnetic circuit including the first and second annular pole pieces with the first poles of the third and fourth electromagnets being magnetically coupled to the first pole piece and the second poles of the third and fourth electromagnets being magnetically coupled to the second pole piece; and wherein the first and second electromagnet control signals are respectively applied to the first and second electromagnets to cancel movement of the rotatable member along the first axis from the uniform spacing and the third and fourth electromagnet control signals are respectively applied to the third and fourth electromagnets to cancel movement of the rotatable member along the second axis from the uniform spacing.

14. A magnetic bearing in accordance with claim 13 wherein:

the magnetic field generated by the electromagnets is additive to the magnetic field produced by the cylindrical magnet along at least one of the first and second axes extending in a radial direction of increased radial spacing between the annuli and the rotatable member and is subtractive from the magnetic field produced by the cylindrical magnet along at least one of the first and second axes extending in a radial direction of decreased radial spacing between the annuli and the rotatable member.

15. A magnetic bearing in accordance with claim 14 wherein:

the first and second magnetic circuits are disposed 90° apart with respect to a circumference of the rotatable member.

16. A magnetic bearing in accordance with claim 15 further comprising:

means for retaining the cylindrical magnet in place.

17. A magnetic bearing in accordance with claim 16 wherein the means for retaining comprises:

a hollow cylindrical sleeve having an inner cylindrical surface for contacting an outer cylindrical surface of the cylindrical magnet, a first end of the sleeve contacting the first annular pole piece and a second end of the sleeve contacting the second annular pole piece.

18. A magnetic bearing in accordance with claim 4 wherein:

the cylindrical magnet is a permanent magnet.

19. A magnetic bearing in accordance with claim 7 wherein:

the cylindrical magnet is a permanent magnet.

20. A magnetic bearing in accordance with claim 13 wherein:

the cylindrical magnet is a permanent magnet.

21. A magnetic bearing in accordance with claim 17 wherein:

the cylindrical magnet is a permanent magnet.

22. A magnetic bearing comprising:

a rotatable member having first and second magnetically permeable annular pole pieces;

first and second electromagnets each having a winding and first and second poles, the first poles and the second poles of the first and second electromagnets being diametrically disposed with respect to the rotatable member and being contained in a first magnetic circuit including the first and second annular pole pieces with the first poles of the first and second electromagnets being magnetically coupled to the first pole piece and the second poles of the first and second electromagnets being magnetically coupled to the second pole piece;

third and fourth electromagnets each having a winding and first and second poles, the first poles and the second poles of the third and fourth electromagnets being diametrically disposed with respect to the rotatable member and being contained in a second magnetic circuit including the first and second annular pole pieces with the first poles of the third and fourth electromagnets being magnetically coupled to the first pole piece and the second poles of the third and fourth electromagnets being magnetically coupled to the second pole piece;

a first sensor for sensing a direction and an amount of movement of the rotatable member along a first axis from a uniform spacing with respect to an annulus defined by poles of the electromagnets and producing a first output signal proportional to the direction and amount of the sensed movement of the rotatable member along the first axis from the uniform spacing;

a second sensor for sensing a direction and an amount of movement of the rotatable member along a second axis from a uniform spacing with respect to an annulus defined by poles of the electromagnets and producing a second output signal proportional to the direction and amount of the sensed movement of the rotatable member along the second axis from the uniform spacing; and a controller, responsive to the first and second output signals, for applying control currents to the windings of the first and second electromagnets proportional to the first output signal and to the windings of the third and fourth electromagnets proportional to the second output signal to cause the rotatable member to move back to the uniform spacing.

23. A magnetic bearing in accordance with claim 22 wherein:

the first and second magnetic circuits are disposed 90° apart with respect to a circumference of the rotatable member.

24. A magnetic bearing in accordance with claim 23 wherein:

the first and second magnetic circuits are comprised of a magnetically permeable material which passes magnetic flux from the poles of a cylindrical magnet of the rotatable member disposed between the first and second annular pole pieces.

25. A magnetic bearing in accordance with claim 24 wherein:

the cylindrical magnet is a permanent magnet.

26. A magnetic bearing comprising:

a rotatable member having a cylindrical magnet having first and second ends which respectively are first and second magnetic poles with a magnetic field produced by the magnet having a uniform strength around a circumference of the first and second ends;

a first sensor for sensing an amount and a direction of movement of the rotatable member along a first axis from a uniform spacing with respect to an annulus surrounding the rotatable member and producing a first signal proportional to the amount and direction of the sensed movement of the rotatable member along the first axis from the uniform spacing; and a first electromagnetic circuit for producing an electromagnetic field proportional to the first signal which is additive to the magnetic field produced by the cylindrical magnet along the first axis extending in a first radial direction of increased radial spacing between the annulus and the rotatable member and which is subtractive from the magnetic field produced by the cylindrical magnet along the first axis extending in a first radial direction of decreased radial spacing between the annulus and the rotatable member.

27. A magnetic bearing in accordance with claim 26 further comprising:
 a second sensor for sensing an amount and a direction of movement of the rotatable member along a second axis orthogonal to the first axis from a uniform spacing with respect to the annulus surrounding the rotatable member and producing a second signal proportional to the amount and direction of the sensed movement of the rotatable member along the second axis; and a second electromagnetic circuit for producing an electromagnetic field proportional to the second signal which is additive to the magnetic field produced by the cylindrical magnet along the second axis extending in a second radial direction of increased radial spacing orthogonal to the first radial direction of increased radial spacing between the annulus and the rotatable member and which is subtractive from the magnetic field produced by the cylindrical magnet along the second axis extending in a second radial direction of decreased radial spacing orthogonal to the first radial direction of decreased radial spacing between the annulus and the rotatable member.

28. A magnetic bearing in accordance with claim 26 wherein:
 the cylindrical magnet is a permanent magnet.

29. A magnetic bearing in accordance with claim 27 wherein:
 the cylindrical magnet is a permanent magnet.

* * * * *